Figure 1:
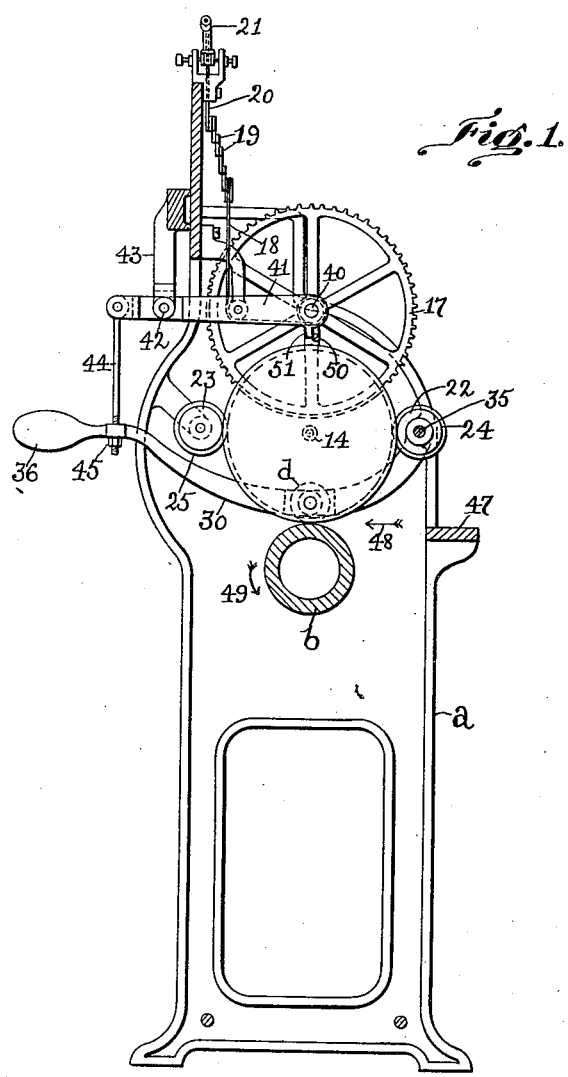

G. H. CAVANAGH.
MACHINE FOR MEASURING SURFACE AREAS.
APPLICATION FILED OCT. 20, 1913.

1,095,704.

Patented May 5, 1914.

2 SHEETS—SHEET 1.

Witnesses:
Ernest A. Telfer
J. Murphy

Inventor:
George H. Cavanagh
by Jas. H. Churchill
Atty.

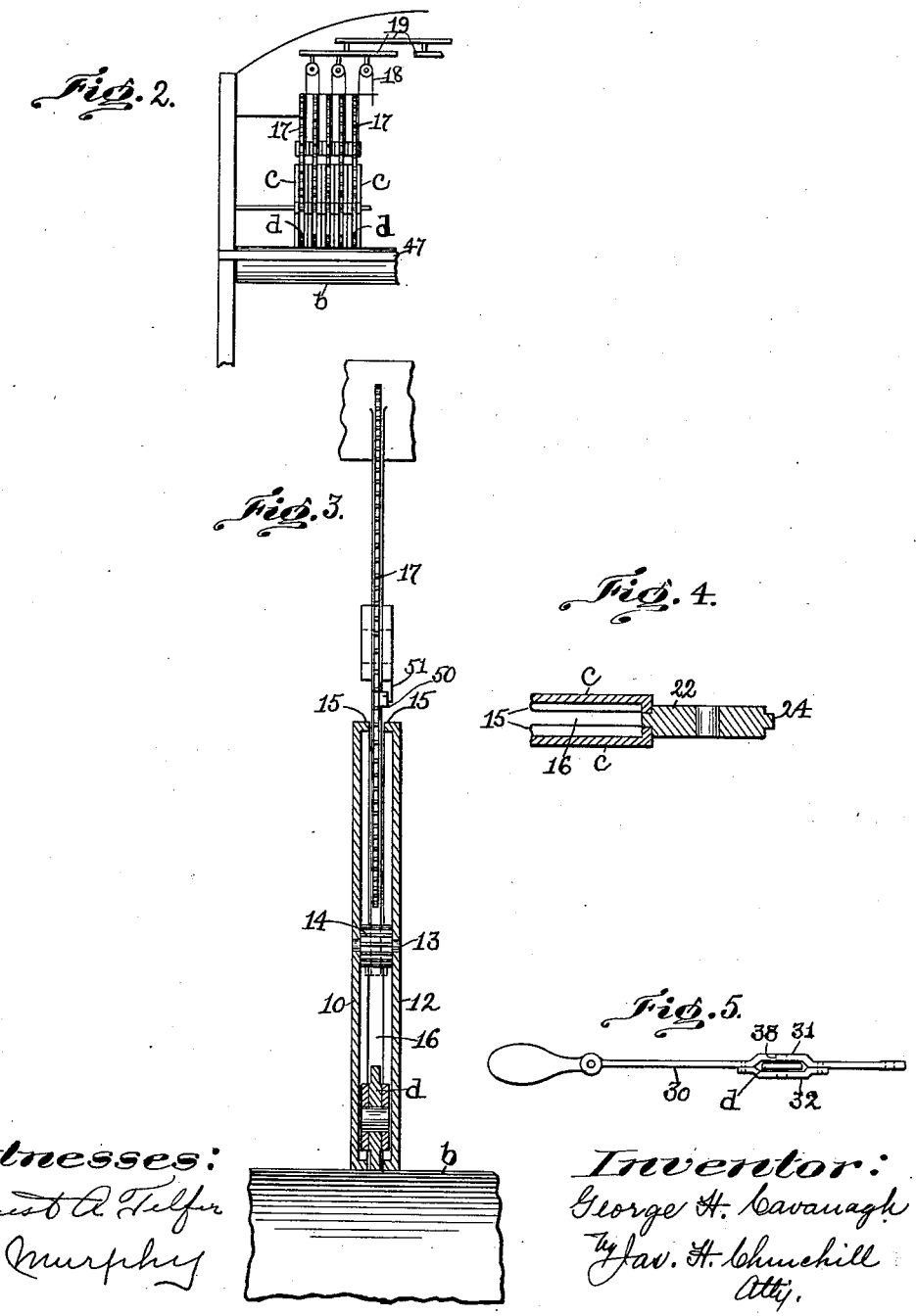

UNITED STATES PATENT OFFICE.

GEORGE H. CAVANAGH, OF BROOKLINE, MASSACHUSETTS.

MACHINE FOR MEASURING SURFACE AREAS.

1,095,704.  Specification of Letters Patent.  Patented May 5, 1914.

Application filed October 20, 1913. Serial No. 796,160.

*To all whom it may concern:*

Be it known that I, GEORGE H. CAVANAGH, a citizen of the United States, residing in Brookline, county of Norfolk, and State of Massachusetts, have invented an Improvement in Machines for Measuring Surface Areas, of which the following description, in connection with the accompanying drawings, is a specification, like characters on the drawings representing like parts.

This invention relates to a machine for measuring surface areas, and is especially designed and adapted among other uses, for measuring hides, skins and leather.

The invention is an improvement upon measuring machines of the well-known Sawyer type, in which measuring wheels are employed to make contact with the hide or skin and to be rotated thereby.

The present invention has for its object to increase the accuracy of measuring machines of the character described, which is accomplished by providing the machine with two sets of measuring wheels, which may be designated main and auxiliary measuring wheels. The auxiliary measuring wheel is operatively connected with the usual toothed wheel or segment, which actuates the indicating mechanism, such as the usual pointer, and the main measuring wheel carries a pinion which engages the toothed wheel or segment. The main measuring wheel is bodily movable independently of the auxiliary wheel, and the bodily movement of the main wheel by the hide, skin or leather, whose surface is to be measured, serves to move its pinion toward the toothed wheel or segment, and the bodily movement of the auxiliary measuring wheel serves to move the toothed wheel or segment toward and into engagement with the said pinion. The main and auxiliary wheels coöperate with the usual bed roll, and owing to difference in diameter of the said wheels, the main wheel is moved bodily by the work before the latter engages and moves the auxiliary wheel, thereby enabling the main wheel to be rotated by the work while this bodily movement is taking place without affecting the indicating mechanism, as the toothed wheel remains unaffected by the bodily and rotary movements of the main wheel until the toothed wheel is engaged with the pinion carried by the main wheel, which does not take place until the auxiliary wheel is engaged by the work and is moved bodily thereby. The main wheel is preferably composed of two disks or members separated from each other, and the auxiliary wheel is located in the space between the members of the main wheel. This arrangement increases the accuracy of the machine by reducing the liability of error caused by the end or edge of the hide or skin engaging only a portion of a measuring wheel, as will be described. These and other features of this invention will be pointed out in the claims at the end of this specification.

Figure 1 is a vertical transverse section of a measuring machine embodying this invention. Fig. 2, a front elevation of a portion of the machine shown in Fig. 1. Fig. 3, a detail on an enlarged scale, illustrating one of the main and one of the auxiliary wheels and the toothed segment coöperating therewith. Fig. 4, a detail in section to be referred to, and Fig. 5, a plane of the auxiliary measuring wheel and its supporting lever.

Referring to the drawing, $a$ represents the framework of a machine for measuring surface areas, which is of the Sawyer type and such as now commonly used for measuring the surface areas of hides, skins and leather, except as to features which will be described in detail and which constitute the essence of this invention. The framework $a$ supports the usual bed roll $b$, with which coöperates a plurality of main measuring wheels $c$ and a plurality of auxiliary measuring wheels $d$. The main measuring wheels $c$ are bodily movable independently of the auxiliary measuring wheels $d$, and each of said main measuring wheels is preferably made of two disks or circular members 10, 12, (see Fig. 3) fast on a center shaft 13 having fast on it a pinion 14, which is located between the members 10, 12. The disks or members 10, 12, are preferably provided with inturned circumferential flanges 15, which are separated by an annular space 16, through which is passed a toothed device 17, herein shown as a wheel but which may be a segment of a wheel, which is designed to be engaged with and rotated by the pinion 14 and which is operatively connected with the pointer of the indicating mechanism, not shown, in a manner well understood, and, in the present instance, the toothed wheel 17 is connected by a cord or chain 18 with a system of levers 19, which are connected by a cord or chain 20 with a main lever 21, which operates the index pointer. The main measuring wheel $c$ is supported at three points, as herein shown, to wit, at its lower portion by the bed roll $b$ on which it normally rests, and at opposite sides by rollers or wheels 22, 23, which latter, if desired, may be provided with central annular flanges 24, 25, which extend into the space 16. The measuring wheel $c$ is capable of being inserted between the bearing wheels 22, 23, and of being withdrawn from between the same, when desired. The auxiliary measuring wheel $d$ is located between the members 10, 12, of the main wheel $c$ and is extended through the space 16 so as to make contact with the bed roll $b$.

The auxiliary wheel $d$ is supported, as herein shown, by a lever 30, which is provided within the main measuring wheel with bearing portions 31, 32, for the shaft 33 of the auxiliary measuring wheel $d$, said bearing portions being offset or separated from each other, (see Fig. 5), and having extended from their opposite ends arms of a sufficient thinness to pass through the space 16 in the circumference of the main measuring wheel. The lever 30 has one end pivotally mounted on a rod 35 supported by the side frames of the machine, and its other or free end is provided with an enlargement 36, which forms a counterweight or balance for the toothed wheel 17, which is connected with the said lever. In the present instance, the toothed wheel 17 has its shaft 40 carried in one end of a lever 41, which is pivoted at 42 to an arm 43 forming part of the framework, and which has its other end connected by a link or rod 44 to the lever 30. The link 44 is pivoted at one end to the lever 41 and has its other end passed through a hole in the lever 30 and provided at its lower end with screw-threads, which are engaged by a nut 45, so that by turning the nut 45, the distance between the two levers 41, 30, may be lengthened or shortened so as to adjust the toothed wheel 17 with relation to the pinion 14. The counterweight 36 acts to keep the auxiliary measuring wheel normally in contact with the bed roll, and also moves the lever 41 so as to raise the toothed wheel 17 out of engagement with the pinion 14 carried by the main measuring wheel.

By reference to Fig. 1, it will be seen that when the hide, skin or leather or other work is fed over the table 47 into the machine, in the direction indicated by the arrow 48, the front edge of the work will engage the main measuring wheel before it engages the auxiliary measuring wheel, which is due to the difference in diameters of the two wheels. The work carried under the main measuring wheel by the bed roll rotating in the direction of the arrow 49, moves the main measuring wheel with which it engages, bodily upward, and brings the pinion 14 nearer to the toothed wheel 17, and the said main measuring wheel is also turned by the work, but its rotation does not affect the indicator or pointer, because the toothed wheel 17 is not engaged with the pinion 14. The work is carried into engagement with the auxiliary measuring wheel $d$ and lifts the same away from the bed roll. This upward movement of the auxiliary measuring wheel effects movement of the toothed wheel 17 toward the pinion 14, through the lever 30, link 44 and lever 41, and engages the toothed wheel 17 with the pinion 14, whereupon further rotation of the main measuring wheel $c$ by the work, whose front edge is still in contact with the main measuring wheel, effects rotation of the toothed wheel 17 and movement of the index pointer or other indicating mechanism. It will thus be seen, that very thin stock or work is capable of being measured, because the distance the toothed wheel 17 is separated from the pinion 14 is reduced by the bodily movement of the main measuring wheel, which enables the engagement of the toothed wheel 17 with the pinion 14 to be effected by a slight bodily movement of the auxiliary measuring wheel. As a result, thin stock or work can be measured accurately as well as thick stock or work.

By reference to Fig. 2, it will be seen that adjacent main measuring wheels are located substantially in contact with each other, and that a maximum number of the said wheels may be employed in a machine of given length, and by reason of the auxiliary measuring wheels being located between the side members of the main measuring wheel, it will be seen that the work engaged by the auxiliary measuring wheel within one main wheel, may overlap and make contact with the circumference of the adjacent side member of the next adjacent main measuring wheel, and can rotate the latter without affecting the indicating mechanism, for the reason that it is necessary for the overlapping edge to engage the auxiliary measuring wheel within the next adjacent main measuring wheel before the indicating mechanism will be affected. It will thus be seen that the liability of error is reduced substantially one-half, for whereas, in machines of this class as now constructed and known to me, a projecting edge of the work may be of less width than the width of a measuring wheel, yet it will effect a registration, because any rotation of the measuring wheel is transmitted to the registering mechanism or pointer, whereas, in the present case, the projecting edge may be of a width substantially equal to one-half of the width of the main measuring wheel in order to affect the registering mechanism, because the projecting edge must be wide enough to engage the auxiliary measuring wheel in order to affect the registering mechanism. As a result, a measuring machine embodying this invention is capable of measuring the surface of irregular objects, such as hides, skins and leather, with great accuracy.

In the present instance, I have shown the auxiliary measuring wheels employed with main measuring wheels composed of two halves or members, but it is not desired to limit the invention in this respect, as they may be used with main measuring wheels of ordinary construction, or with one half of the main measuring wheels herein shown.

It will be observed that in the machine herein shown, the main measuring wheels are externally supported within the width of the circumference of the wheel, thereby enabling the usual center support for measuring wheels to be dispensed with, and also enabling the main measuring wheels to be set closer together and a large number to be assembled in a given length of machine.

The toothed wheel 17 is provided with a pin or stud 50, which engages a back-stop in the form of a lug 51 on the lever 41.

Claims:

1. In a machine of the character described, in combination, a bed roll, a main measuring wheel normally resting on said bed roll and composed of two disks or members separated from each other, a pinion located between and carried by said members, a toothed device extended between the members of said measuring wheel and coöperating with said pinion, an auxiliary measuring wheel located between the members of the main measuring wheel and normally resting on said bed roll, a lever carrying said auxiliary measuring wheel and extended between the members of the main measuring wheel, a lever carrying said toothed device, means for connecting said levers, and a weight attached to the lever carrying the auxiliary measuring wheel, substantially as described.

2. In a machine of the character described, in combination, a main measuring wheel bodily movable by the work whose surface is to be measured, a pinion carried by said main measuring wheel, a toothed device coöperating with said pinion and normally separated therefrom, a support for said toothed device, an auxiliary measuring wheel bodily movable by the work whose surface is to be measured, a support for said auxiliary measuring wheel, and means for connecting said supports, for the purpose specified.

3. In a machine of the character described, in combination, a main measuring wheel, and an auxiliary measuring wheel, both bodily movable by the work whose surface is to be measured, a device movable with the main measuring wheel, and a device movable with the auxiliary measuring wheel and coöperating with the first-mentioned device, substantially as described.

4. In a machine of the character described, in combination, a main measuring wheel composed of two disks or members separated by a circumferential space, and an auxiliary measuring wheel of smaller diameter than said main measuring wheel and extended into the circumferential space between the members of the main measuring wheel, for the purpose specified.

5. In a machine of the character described, in combination, a measuring wheel provided with side members separated from each other, a center shaft connecting said members, a pinion on said center shaft between said side members, and a toothed device extended between said side members and coöperating with said pinion.

In testimony whereof, I have signed my name to this specification in the presence of two subscribing witnesses.

GEORGE H. CAVANAGH.

Witnesses:
Jas. H. Churchill,
J. Murphy.

Copies of this patent may be obtained for five cents each, by addressing the "Commissioner of Patents, Washington, D. C."